(12) United States Patent
Roman et al.

(10) Patent No.: US 11,097,468 B2
(45) Date of Patent: *Aug. 24, 2021

(54) COOLING OF BUILD MATERIAL IN THREE DIMENSIONAL PRINTING SYSTEM

(71) Applicant: HEWLETT-PACKARD DEVELOPMENT COMPANY, L.P., Houston, TX (US)

(72) Inventors: Justin M. Roman, Portland, OR (US); Xavier Alonso Becerro, Sant Cugat del Valles (ES); Ismael Chanclon Fernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 298 days.

This patent is subject to a terminal disclaimer.

(21) Appl. No.: 16/095,931

(22) PCT Filed: Sep. 6, 2016

(86) PCT No.: PCT/US2016/050363
§ 371 (c)(1),
(2) Date: Oct. 23, 2018

(87) PCT Pub. No.: WO2017/196383
PCT Pub. Date: Nov. 16, 2017

(65) Prior Publication Data
US 2019/0134889 A1   May 9, 2019

(30) Foreign Application Priority Data

May 12, 2016 (WO) ................ PCT/EP2016/060780
May 12, 2016 (WO) ................ PCT/US2016/032198
Jul. 26, 2016 (WO) ................ PCT/US2016/043970

(51) Int. Cl.
*B29C 64/141* (2017.01)
*B29C 64/227* (2017.01)
(Continued)

(52) U.S. Cl.
CPC ............ *B29C 64/141* (2017.08); *B22F 10/20* (2021.01); *B29C 37/0003* (2013.01);
(Continued)

(58) Field of Classification Search
CPC . B29C 64/141; B29C 37/0003; B29C 64/314; B29C 64/255; B29C 64/393;
(Continued)

(56) References Cited

U.S. PATENT DOCUMENTS 5,622,577 A   4/1997   O'Connor
8,185,229 B2  5/2012   Davidson
(Continued)

FOREIGN PATENT DOCUMENTS

CN   1608832     4/2005
CN   103552240   2/2014
(Continued)

OTHER PUBLICATIONS

International Search Report and Written Opinion for International Application No. PCT/US2016/050363 dated Feb. 16, 2017, 7 pages.

*Primary Examiner* — Nahida Sultana
(74) *Attorney, Agent, or Firm* — HP Inc. Patent Department (57) ABSTRACT

A build material management apparatus for a three dimensional printing system is provided having a plurality of conduits to connect to a respective plurality of ports of at least one build material container. Processing circuitry is provided to control coupling of a 5 pump interface to the plurality of conduits to independently set, for at least two of the plurality of conduits, a given air flow parameter for (Continued)

cooling build material in the at least one build material container. A build material container and machine executable instructions are also provided.

10 Claims, 3 Drawing Sheets (51) Int. Cl.
| | |
|---|---|
| B29C 64/255 | (2017.01) |
| B29C 64/314 | (2017.01) |
| B33Y 40/00 | (2020.01) |
| B29C 64/35 | (2017.01) |
| B29C 37/00 | (2006.01) |
| B22F 10/20 | (2021.01) |
| B33Y 30/00 | (2015.01) |
| B29C 64/379 | (2017.01) |
| B29C 64/357 | (2017.01) |
| B29C 64/25 | (2017.01) |
| B29C 64/393 | (2017.01) |
| B29C 64/153 | (2017.01) |
| B29C 64/165 | (2017.01) |
| B29C 35/16 | (2006.01) |
| B33Y 10/00 | (2015.01) |

(52) U.S. Cl.
CPC ............ *B29C 64/227* (2017.08); *B29C 64/25* (2017.08); *B29C 64/255* (2017.08); *B29C 64/314* (2017.08); *B29C 64/35* (2017.08); *B29C 64/357* (2017.08); *B29C 64/379* (2017.08); *B29C 64/393* (2017.08); *B33Y 30/00* (2014.12); *B33Y 40/00* (2014.12); *B22F 2999/00* (2013.01); *B29C 64/153* (2017.08); *B29C 64/165* (2017.08); *B29C 2035/1658* (2013.01); *B33Y 10/00* (2014.12); *Y02P 10/25* (2015.11)

(58) Field of Classification Search
CPC ... B29C 64/227; B29C 63/379; B29C 64/357; B29C 64/25; B29C 64/35; B29C 64/153; B29C 64/165; B29C 2035/1658; B22F 3/1055; B22F 2999/00; B22F 2003/1059; B33Y 30/00; B33Y 40/00; B33Y 10/00; Y02P 10/25

See application file for complete search history.

(56) References Cited

U.S. PATENT DOCUMENTS

| | | | |
|---|---|---|---|
| 2009/0255912 A1 | 10/2009 | Dietrich | |
| 2010/0140852 A1 | 6/2010 | Kritchman et al. | |
| 2014/0035182 A1* | 2/2014 | Boyer | B29C 64/393 264/40.1 |
| 2015/0266211 A1 | 9/2015 | Wolfgang et al. | |
| 2015/0266238 A1* | 9/2015 | Ederer | B29C 67/0077 264/460 |
| 2017/0266876 A1* | 9/2017 | Hocker | B29C 64/106 |
| 2018/0207876 A1* | 7/2018 | Querol Esparch | B33Y 40/00 |

FOREIGN PATENT DOCUMENTS

| | | |
|---|---|---|
| CN | 104959606 | 10/2015 |
| DE | 102014010501 | 1/2016 |
| WO | WO03035519 | 5/2003 |
| WO | WO2015051261 | 4/2015 |
| WO | WO2016030530 | 3/2016 |

* cited by examiner

COOLING OF BUILD MATERIAL IN THREE DIMENSIONAL PRINTING SYSTEM

BACKGROUND

Additive manufacturing systems that generate three-dimensional, 3D, objects on a layer-by-layer basis have been proposed as a potentially convenient way to produce three-dimensional objects in small quantities.

The efficiency of additive manufacturing systems varies. 3D objects generated by some additive manufacturing systems such as 3D printing systems utilising heat to fuse build material and laser sintering systems may have a cooling-down period after manufacture prior to further processing.

BRIEF DESCRIPTION OF THE DRAWINGS

Examples of the disclosure are further described hereinafter with reference to the accompanying drawings, in which.

DETAILED DESCRIPTION

Figure 1:
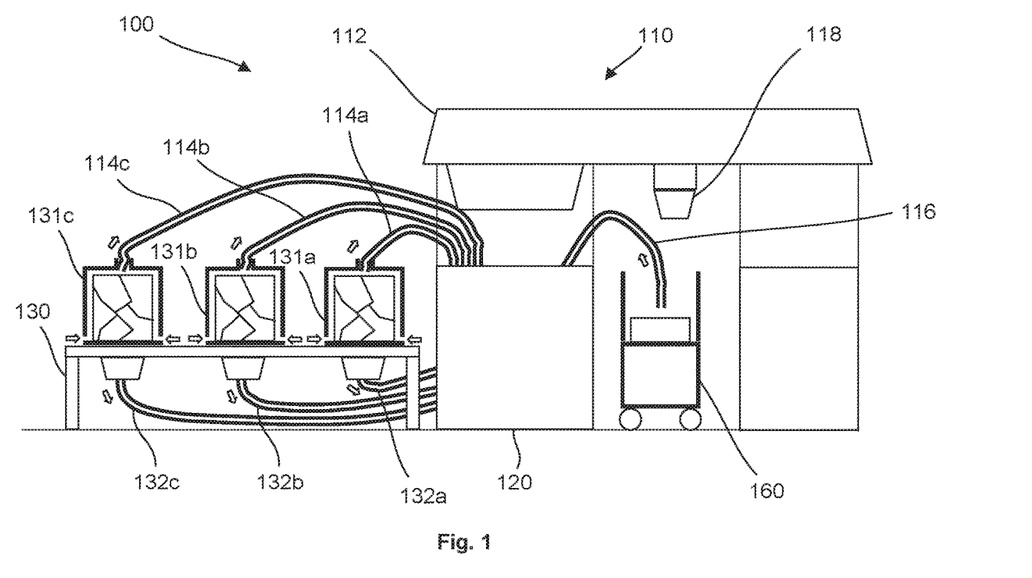
FIG. 1 is a diagram of an example of a build material management system for a 3D printing system.

FIG. 1 shows a diagram of an example of a build material management system 100 for a 3D printing system. The build material management system 100 is for use in a 3D printing system. The 3D printing system may comprise a 3D printer (not shown) to generate three-dimensional objects on a layer-by-layer basis, which may be referred to as an additive manufacturing process. The three-dimensional objects are generated from build material which may be in the form of a powder. The build material may be selectively fused together, in layers, to form three-dimensional objects. The fusing process may be as a result of the application of directed heat to the build material or as a result of a chemical process in which the build material is bound using chemical binders, and may result in significant amounts of heat within a volume of the build material.

The build material may be or include, for example, powdered metal materials, powdered composite materials, powdered ceramic materials, powdered glass materials, powdered resin materials, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance.

The build material management system 100 comprises a build material management station 110 to perform build material management operations on build material contained within transportable containers. In the example shown, are three containers being used as 'hot' build material containers 131a, 131b, 131c, comprising hot build material. A build material container in the form of a trolley 160 is also provided, which may have a removable (releasably detachable) or fixed container for build material provided thereon. The trolley 160 may comprise cooled build material ready for processing by a user using a build material extraction hose 116. The build material on the trolley 160 may have cooled naturally or may have been cooled using one or more of the 'hot' build material containers 131a, 131b, 131c. The trolley 160 could alternatively contain hot build material. The build material management station 110 has a housing 112 comprising a pumping module 120. The hot build material containers 131a, 131b, 131c may be removable The pumping module 120 may have one or more integral pump(s) for providing a controlled flow of air via positive or negative pressure. A fan may be one example of a positive pressure pump. In alternative examples the build material management station 110 may have a pumping interface for releasable connection to one or more separate pumps. In examples having an integral pump, a pump interface (pressure source) may be provided internally in the build material management station 110. Thus a connection to a pump interface as described herein may relate to a connection to one or more integral pumps or to one or more releasably connected pumps for controlling air flow in or externally to the build management station 110. External air flow control may be provided by one or more conduits or air inlet or outlet ports on the build management station 110. In some examples, both a positive pressure pump and a negative pressure pump interface is provided via the pumping module 120.

The pumping module 120 may be a vacuum pump that pumps air and/or build material from the plurality of build material containers 131a, 131b, 131c, 160 to the build material management station 110 and is described in more detail with reference to FIG. 5 below. In the FIG. 1 example, the pumping module 120 is connected to each of the build material containers 131a, 131b, 131c by respective conduits in the form of three cooling upper portion connection hoses 114a, 114b, 114c. The upper portion hoses 114a, 114b, 114c may be considered to be conduits external to the build material management 110 station, but the build material management station has a conduit network (not shown, but see the FIG. 5 example) within the pumping module 120 capable of providing controlled air flows to each of the upper portion connection hoses 114a, 114b, 114c and also three lower portion connection hoses 132a, 132b, 132c as appropriate. In some examples all of the plurality of upper and lower connection hoses may be connected to one or more build material containers, but in other examples, only a subset of the plurality of hoses may be connected to a build material container. The controller of the build material management station 110 may automatically detect a connection status of each hose and close valves that are arranged to provide an air flow to conduits corresponding to any unconnected hoses. Each upper portion connection hose 114a, 114b, 114c may be connected to the respective build material container 131a, 131b, 131c at an upper portion of a wall or face of the build material container.

In the FIG. 1 example the build material management station 110 is provided with a total of six hoses, with two hoses connecting to each of the three build material containers 131a, 131b, 131c. In alternative examples, a plurality of connection hoses fed by respective air flow ports originating in the pumping module 120 of the build material management station 110 may be interchangeably connected to multiple air flow ports in different locations on a set comprising one or more build material containers. A given build material container may be connected to one or more of the plurality of hoses (see FIG. 2 and FIG. 3 described below). The plurality of hoses allow cooling to be simultaneously performed in a plurality of containers, with each container being connected to at least one air flow. Processing circuitry in the build material management station may independently set at least one air flow parameter to have a different value in at least two of the hoses. Thus the build material management station 100 may provide different cooling air flows to suit, for example, different container types and shapes and different build materials. In some examples, a subset comprising at least one of the build material management station connection hoses of the plurality of hoses may be arranged to provide air flow at a positive pressure whilst a complementary subset of at least one of the plurality of hoses may be arranged to provide an air flow at a negative pressure. Different connectors may be provided on the positive pressure and negative pressure hoses and different pumps or pump interfaces within the pumping module may feed air flows to different ones of the connection hoses.

A connection mechanism between a hose and a build material container in the FIG. 1 example comprises an end of the hose 114a, 114b, 114c being attached to a port provided on the body of the respective build material container 131a, 131b, 131c. In alternative examples, connection between a hose and a build material container may be provided by a connector attachment on the end of the hose cooperating with an interface on a corresponding inlet or outlet on the body of the build material container or by a connector body having both a hose-receiving interface and a container attachment interface. The presence of a physical connection between an end of the hose furthest from the build material management station and one of the ports on the build material containers 131a, 131b, 131c may be automatically detected by the build material management station 110 using, for example, a pressure sensor or a pressure switch located in the attaching portion of the hose, in the connector attachment or even within a conduit in the pumping module 120 itself. A controller or processing circuitry (see FIG. 6) in the build material management station 110 may use feedback from the pressure sensor(s) and/or pressure switches to determine how to set valves of a valve arrangement in conduits within the build material management station 100. The valve arrangement may comprise one or more valves.

The upper portion connection hoses 114a, 114b, 114c in the example of FIG. 1 are connected to input ports in a top face of the respective build material container 131a, 131b, 131c, but in alternative examples, the upper portion connection hoses may be connected to air inlet (or outlet) ports, for example, in an upper portion of a side wall of the respective build material container 131a, 131b, 131c. In some examples, the upper portion connection hoses 114a, 114b, 114c may be readily separable from the material management station 110 so that they may be easily detached for replacement and maintenance.

The pumping module 120 may be connected to the trolley 160 by a further conduit in the form of the build material extraction hose 116. The build material extraction hose 116 may be connected to the trolley 160 via an unpacking port or station provided between the build material extraction hose 116 and the trolley 160.

The pumping module 120 in the FIG. 1 example is connected not just via the upper portion connection hoses 114a, 114b, 114c, but also connected to each of the build material containers 131a, 131b, 131c by further respective conduits in the form of three cooling lower portion connection hoses 132a, 132b, 132c. Each lower portion connection hose 132a, 132b, 132c is connected to the respective build material container 131a, 131b, 131c at a lower portion of the build material container. The lower portion connection may be in a base of the build material container as in the FIG. 1 example, or on a location in a lower part of a side wall.

Similarly to the upper portion connection hoses 114a, 114b, 114c, in some examples, the lower portion connection hoses 132a, 132b, 132c may connect directly to a cooperatively shaped port provided on a lower portion of the body of a respective build material container 131a, 131b, 131c. In other examples a connector may be provided on the end of the connection hose 132a, 132b, 132c and in further examples a connector may be releasably connected to both the connection hose and the corresponding port on the build material container.

The upper portion connection and lower portion connection between a pump interface (pressure source) of the build material management station 110 and any given build material container may be upper and lower relative to each other when a cooling and/or build material collection process is being performed by the build material management station. Build material may be assisted by gravity to fall from the upper portion to the lower portion. In the FIG. 1 example, the lower portion connection hoses 132a, 132b, 132c are connected to the bases of the respective build material container 131a, 131b, 131c, but in alternative examples the lower portion connection hoses may be connected to ports on a lower portion of the side wall of the respective build material container 131a, 131b, 131c.

Each of the build material containers 131a, 131b, 131c is situated on a build material container stand 130 provided adjacent to the housing 112 of the build material management station 110. Example structures of the build material containers 131a, 131b, 131c are described in more detail with reference to FIGS. 2 to 4 below.

The build material containers 131a, 131b, 131c, 160 may contain a build material volume comprising one or more 3D printed parts, surrounded by a portion of non-fused or non-sintered (non-coalesced) build material, for example. Depending on what type of 3D printing operation has been used to create those 3D printed parts, a temperature of the build material volume immediately after the 3D printing operation and for some time after may be too high for safe and/or effective removal of the one or more 3D printed parts from the build material volume. The build material volume may therefore be allowed to cool prior to an unpacking operation in which the one or more 3D printed parts formed, for example by fusing or laser sintering, are separated from the surrounding portion of excess build material.

In the FIG. 1 example, the build material volume is transferred from a further build material container (not shown) into the build material containers 131a, 131b, 131c after the 3D printing operation. The volume of build material in each of the containers 131a, 131b, 131c was, in this example, processed in a 3D printer whist in a different container. The build material volume within any given one of the build material containers 131a, 131b, 131c is actively cooled by drawing air through the build material containers 131a, 131b, 131c through either or both of the cooling upper portion connection hose 114a, 114b, 114c and the cooling lower portion connection hose 132a, 132b, 132c using the pumping module 120. By virtue of the temperature of the ambient air in the air flow created by the pumping module 120 being lower than that of the hot build material volume, the build material volume is actively cooled by the controlled air flow. After the active cooling operation, the build material containers 131a, 131b, 131c each become a cooled build material container. Each build material container 131a, 131b, 131c may be readily removable from at least one of the respective cooling upper portion connection hose 114a, 114b, 114c and the cooling lower portion connection hose 132a, 132b, 132c and thus may be transportable. The cooled build material containers may be transported to the trolley 160 for processing, for example, using the build material extraction hose 116. The cooled build material containers may be placed on or releasably attached to a base portion of the trolley 160.

In another example, instead of using a vacuum pump in the pumping module 120 to draw the air through the hot build material containers 131a, 131b, 131c to either or both of the cooling upper portion connection hose 114a, 114b, 114c and the cooling lower portion connection hose 132a, 132b, 132c, a positive pressure pump such as a fan may be used to cause air to flow through either or both of the cooling upper portion connection hose 114a, 114b, 114c and the cooling lower portion connection hose 132a, 132b, 132c to and through the build material containers 131a, 131b, 131c.

Due to the flexibility of being able to independently set one or more air flow parameters in at least two of the connection hoses 114a, 114b, 114c and 132a, 132b, 132c of the build material management station 100, the cooling air flows can be used to perform a partial unpacking operation, during which some non-coalesced build material is removed from the build material containers 131a, 131b, 131c. The ability to independently set the air flow parameters allows the parameters to be set identically in different conduits or to be set differently in different conduits as required. The lower portion connection hoses 132a, 132b, 132c may allow for a partial unpacking operation to be gravity assisted. In other examples, cyclonic filters may be used in ports on the build material container to perform partial unpacking.

In some examples, the cooled build material volume may then be transferred to a further build material container, such as a container on the trolley 160 for an unpacking operation in which a 3D printed object is separated from surrounding unfused build material. The build material container may be referred to as an empty build material container after removal of the cooled build material volume. The empty build material container may then be re-used in a further cooling operation after having received a further hot build material volume output by the 3D printer. In other examples, the build material container may be moved to an unpacking module without removing the build material volume from the build material container.

The unpacking operation in this example comprises removing the cooled excess build material surrounding the fused or sintered build material forming the 3D manufactured object from the trolley 160 via the build material extraction hose 116. A free end of the build material extraction hose 116 is moveable so as to be manoeuvred about the build volume, for placement wherever suitable for best separation of the cooled excess build material from the 3D printed parts. This unpacking operation may be performed by an operator, such as a person, manipulating the free end of the build material extraction hose 116. The operator may manipulate the build volume during the unpacking operation. The unpacking operation may be performed by the pumping module 120 operating as an unpacking module. In other words, the build material extraction hose 116 may be connected to the same pump interface as the cooling connection hoses 114a, 114b, 114c, 132a, 132b, 132c under routing control using, for example a valve arrangement to control pressure differences within a conduit network attached to the pump interface. The build material extraction hose 116 may be connected to a build material container within the build material management station 110 to receive the extracted excess build material not forming part of the fused or laser sintered 3D printed object.

After the unpacking operation, the 3D printed parts may be removed from the trolley 160. In some examples, the 3D printed parts may be removed from the trolley 160 as part of the unpacking operation. Following the unpacking operation, a container provided on the trolley 160 may be referred to as an empty build material container. The empty build material container from the trolley may then be re-used in a subsequent unpacking operation after receiving a further cooled build material volume from one or more of the build material containers 131a, 131b, 131c used in the cooling process.

In some examples, the same build material containers are also used to provide build material to the 3D printer (not shown) for a subsequent 3D printing operation. In this way, the empty build material container from the trolley 160 may be filled with non-coalesced build material and moved to the 3D printer for use in a further 3D printing operation.

In the FIG. 1 example, the housing 112 also comprises a filling port 118 for filling an empty build material container with build material after completion of the unpacking operation. The build material container is filled with build material for a further 3D printing operation in the 3D printer. The build material may be fresh, or a mix of fresh and previously used recovered unfused build material.

In some examples build material may be transferred manually by a user between different containers for each of the following processes: 3D printed part generation in a 3D printer; printed build volume cooling in the build material management station 100; cooled printed build volume processing to separate unfused build material from printed parts in the build material management station 100; and filling a tank of a 3D printer with build material to be used in a 3D printing operation. In other examples the same build material container may be re-used for two or more of these processes. For example, the build material container 131a may be detached from the upper connection hose 114a and the lower connection hose 132a at the end of a cooling operation and then affixed to a base of the trolley 160 for the unpacking operation. The same container, once free from the printed parts and unfused build material, may then be filled by the material management station 100 with fresh and/or recovered build material for use in a 3D printer for a printing operation.

An active cooling operation performed using the pumping module 120 may comprise drawing air through one at a time of the plurality of hot build material containers 131a, 131b, 131c connected to the pumping module 120 via the respective cooling upper portion connection hoses 114a, 114b, 114c and the respective cooling lower portion connection hoses 132a, 132b, 132c, in a cycling operation. In this way, the pumping module 120 may be controlled to draw air through the first build material container 131a and subsequently to draw air through the second build material container 131b and further subsequently to draw air through the third build material container 131c. The process may then be repeated to continue the active cooling operation of all three build material containers 131a, 131b, 131c in parallel without air being drawn through each of the build material containers 131a, 131b, 131c simultaneously.

As discussed below, one or more air flow parameter such as the time and or rate at which cooling air is flowing, as well as any changes in direction of flow may be independently controlled in different ones of at least two of a plurality of conduits of the build material management station 110, which may allow different air flow characteristics to be provided in different ones of the build material containers 131a, 131b, 131c. At least two conduits having differently set air flow parameters may be connected to a single build material container 131a, 131b, 131c to promote more efficiently cooling by cooperatively controlling the different air flows. In an alternative method of operation, air may be drawn through each of the build material containers 131a, 131b, 131c simultaneously or otherwise. As will be described in more detail with reference to FIGS. 2 to 4 below, air may be drawn through one or both of the cooling upper portion connection hoses 114a, 114b, 114c and the cooling lower portion connection hoses 132a, 132b, 132c at a given time.

Many factors may influence the cooling time for a build material volume, including, but not limited to: the type of build material, the volume of the build material, the quantity, size and shapes of the one or more 3D printed parts within the volume, the rate of cooling air flow and the hardness of the volume of build material (i.e. the resistance to break-up of the volume of build material). Accordingly, the active cooling operation for each different build material container may be different. By way of example, there may be differences for different containers between at least one of the following: timing characteristics of pumped air flow (for example, pulsing); a rate at which cooling air is flowing; and a direction of air flow. Furthermore, timings of changes in direction of flow may be independently controlled for each transportable container. This could be based on knowledge of the contents of a transportable container (for example from data stored on a memory on the transportable container or input from a user.) In some examples, the specific active cooling operation parameters may be determined based on a single parameter of the volume of build material, such as size (e.g. a height). Although such an approach may not be completely matched to the exact properties of the volume of build material to be cooled, this allows for a relatively small number of options from which a user may select, ensuring the user-interface remains simple to use. In another example, the specific active cooling operation parameters may be adjusted by processing circuitry of the build material management station 110 based on feedback from a sensor, such as a thermal sensor (e.g. a thermocouple probe) to be embedded within or adjacent to the volume of build material.

Figure 2:
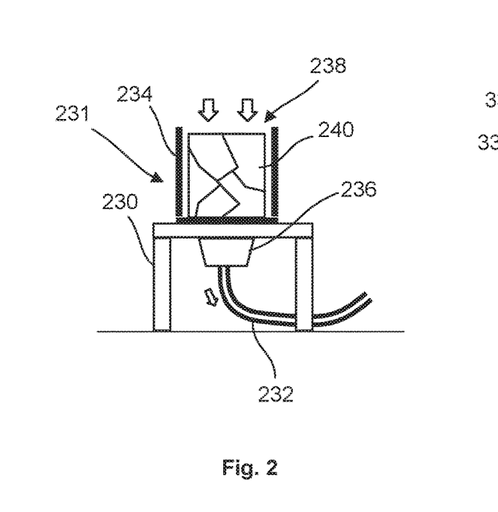
FIG. 2 is a diagram of an example of a cooling module for use in a build material management system.

FIG. 2 is a diagram of an example of a cooling module for use in a build material management station 110. The cooling module comprises a build material container 231 supported above a ground surface on a build material container stand 230. The build material container 231 comprises a housing 234 at least partially enclosing a volume of build material 240. Directly after a 3D printing operation and for a time thereafter, as discussed above, the volume of build material 240 can be warm. In this example, the housing 234 is substantially cuboidal and encloses the volume of build material 240 on five sides. The housing 234 is open at an upper end 238 thereof. Thus, the volume of build material 240 may be enclosed on a bottom, and all four substantially vertical sides, but is not enclosed at an upper end thereof. In this way, the build material container 231 is a non-airtight container.

In the FIG. 2 example, the build material container 231 has a lower port 236 in a lower portion thereof to allow an air flow out of the housing 234 and through the volume of build material 240. In this example, a lower portion connection hose of the build material management station 110 may be in a connected state with the lower port 236, whilst an upper portion connection hose may be in a disconnected state. In one example a plurality of build material containers 231 having only a lower portion connection hose may be provided, with different ones of the plurality of hoses 114a, 114b, 114c, 132a, 132b, 132c of the build material management station being connected to different build material containers.

Sensors such as pressure sensors may be provided in the build material management station 110 to automatically detect a connection state of at least one of the hoses to the build material container 231. A difference in a pressure reading relative to atmospheric pressure may provide an indication that the hose is in a connected state. Alternatively a pressure switch may be provided to detect mechanical engagement between, for example, the end of the respective hose and a port on the build material container 231. Signals from the pressure sensor or pressure switch may be fed back to processing circuitry of the build material management station 110 so that a valve arrangement of a conduit system of the build material management station 110 can be appropriately configured depending upon the current connection status. For example, in the FIG. 2 arrangement when the upper portion connection hose is in a disconnected state one or more valves in the conduit feeding the disconnected hose may be closed to block a path between the disconnected hose and the pump interface. In some examples the pressure sensor may be provided in a portion of the conduit internal to the build material management station and in other examples the pressure sensor may be provided in the length of hose external to the build material management station 110, such as in the end of the hose that may engage with a port on the build material container 231.

In examples intended to receive a single build material container, a total of two hoses comprising one upper portion connection hose and one lower portion connection hose may be provided by the build material management station 110. An air flow driven by a pump interface of the build material management station 110 enters the housing 234 through the open upper end 238. The lower port 236 of the build material container 231 is connected to a cooling lower portion connection hose 232, in turn connected to the build material management station described previously with reference to FIG. 1. In use, a pressure differential may be applied via the cooling lower portion connection hose 232 with a pressure lower than atmospheric pressure applied to a build material management system end of the cooling lower portion connection hose 232. In this way, air at atmospheric pressure may be drawn into the build material container 231 through the open upper end 238 to create the controlled air flow. The air flow passes through and/or around the volume of build material 240. The air flow causes air surrounding the volume of build material 240 which is heated by the warm volume of build material 240 to be removed and replaced by cooler air. In this way, a speed of the cooling of the volume of build material 240 can be increased. In some examples, the volume of build material 240 at least partially breaks apart as a result of the air flow through the build material container 231, resulting in yet further improved cooling.

Positioning of the lower port 236 in the lower portion of the build material container 231 may be effective for breaking apart the volume of build material 240 due to the air flowing in the same direction in which gravity is acting. In this way, a reduced force may be used to dislodge parts of the volume of build material 240. In some examples, the build material management station (not shown in FIG. 2), which is connected to the lower port 236 via the cooling lower portion connection hose 232, may control the pumping module to draw air intermittently through the build material container 231. By pulsing the air flow in this way, the volume of build material 240 is likely to cool more quickly compared to a constant, unidirectional air flow past the volume of build material 240. The reasons for this are varied, but may include: greater agitation of the air as a result of rapid variations in flow speed which causes a more turbulent air flow more likely to remove any heated air near the volume of build material 240 quickly; an increased dislodging of non-coalesced (e.g. non-fused or non-sintered) build material from the volume of build material 240 resulting in an increase in the exposed surface area of the non-coalesced build material promoting improved cooling; and the dislodged non-coalesced build material in the air flow having an abrasive effect on the volume of build material 240, which helps to dislodge further non-coalesced build material from the volume of build material 240.

In some examples, the build material management system may control the pumping module using processing circuitry of the controller (see FIG. 6) to draw air in a first direction through the build material container 231 for less than, for example, one minute at a time. In some examples, the build material management station 110 may control the pumping module 120 to draw air in a first direction through the build material container 231 for less than, for example, 30 seconds at a time. In some examples, the build material management system may control the pumping module to draw air intermittently through the build material container 231. In other examples, the build material management system may control the pumping module to draw air continuously through the build material container 231 for a given time interval, either at a constant or varying air flow rate. The air flow may be controlled by operation of one or more valves (not shown) in the pumping module of the build material management system. Processing circuitry may control opening and closing of valves in the valve arrangement and may control the air flow parameters such as air flow rate, air flow direction (e.g. sucking or blowing air through a given conduit) and air flow pattern. The air flow pattern may comprise setting one or more air flow parameters to provide a controlled variation in air flow rate in a given time interval such as a progressive increase or decrease in air flow rate or may comprise a controlled transition between a continuous cooling air flow and an intermittent or pulsed cooling air flow. Where two or more of the connection hoses 131a, 131b, 131c, 132a, 132b, 132c are connected to a single build material container, the controller of the build material management station 110 may be arranged to independently set air flow parameters (flow rate, flow pattern, flow direction, changes in air flow with time) through the different connection hoses to control and overall air flow through the given build material container to perform cooperative cooling via the plural air flows.

Figure 3:
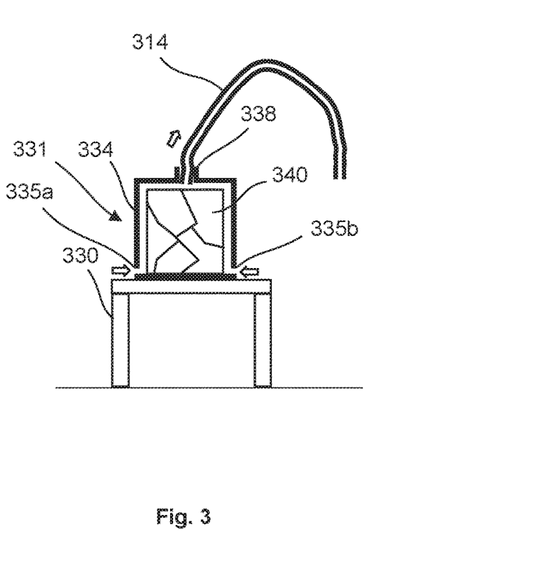
FIG. 3 is a diagram of another example of a cooling module for use in a build material management system.

FIG. 3 is a diagram of another example of a cooling module for use in a build material management system. In a similar way to the cooling module described previously with reference to FIG. 2, a build material container 331 is supported above a ground surface on a build material container stand 330. The build material container 331 comprises a housing 334 substantially enclosing a volume of build material 340. In the FIG. 3 example, the housing 334 is cuboidal and encloses the volume of build material 340 on each of six sides. The housing 334 has defined therein an upper port 338 provided in an upper portion of the housing 334, located substantially centrally in a top face of the housing 334. The upper port 338 is to allow air to flow out of the build material container 331 in this example where a vacuum pump is used. The upper port 338 may be provided with one or more fixings (not shown) to releasably connect to a cooling upper portion connection hose 314. The cooling upper portion connection hose 314 is connected to the build material management system as described previously in relation to FIG. 1.

In the FIG. 3 example, similarly to FIG. 2, one but not the other of the upper portion connection hose and the lower portion connection hose is connected to the build material container to perform cooling. In the FIG. 3 example the upper portion connection hose is in a connected state whereas the lower portion connection hose is in a disconnected state. Similarly to the arrangement of FIG. 2, a pressure sensor or pressure switch may be used to allow processing circuitry to automatically detect a connection state of the upper and lower connection hoses and thus to control a valve system to close a conduit in the build material management station 110 providing a path between the pump interface and the disconnected lower portion connection hose. The housing 334 also has air holes (vents) 335a, 335b in a lower portion of its side walls. In some examples a single air hole is provided, but two or more air holes may be provided as in FIG. 3. The air holes 335a, 335b are to allow air to flow from the environment into the build material container 331. Thus, the build material container 331 is a non-airtight container. In this example, the air holes 335a, 335b are located, one each side, at a lowermost end of the housing 334.

In a similar way to the cooling module described in relation to FIG. 2, a pressure differential may be applied via the cooling upper portion connection hose 314 with a pressure lower than atmospheric pressure applied to a build material management system end of the cooling upper portion connection hose 314. In this way, air at atmospheric pressure may be drawn into the build material container 331 through the air holes 335a, 335b to create the air flow. The air flow passes through and/or around the volume of build material 340. The air flow causes any air surrounding the volume of build material 340 which is heated by the warm volume of build material 340 to be removed and replaced by cooler air. In this way, a speed of cooling of the volume of build material 340 can be increased. In some examples, the volume of build material 340 at least partially breaks apart as a result of the controlled air flow promoted by the pump through the build material container 331, resulting in yet further improved cooling. The build material management station 110 (not shown in FIG. 3), which is connected to the upper port 338 via the cooling upper portion connection hose 314, may control the pumping module (not shown in FIG. 3) to draw air intermittently through the build material container 331. The air flow parameter comprising the air flow rate may be controlled to be variable or constant during the intermittent bursts. The air flow may be controlled by operation of one or more valves (not shown) of a valve arrangement in the pumping module of the build material management system. The valves may be computer-controlled or manually controlled.

In one example a plurality of build material containers 331 having only a lower portion connection hose may be provided, with different ones of the plurality of hoses 114a, 114b, 114c, 132a, 132b, 132c of the build material management station being connected to the different build material containers. In other examples an arrangement similar to FIG. 1 but having a plurality of different containers with differently located connection ports may be provided, some containers with both upper and lower ports, some containers with only a lower port as illustrated in FIG. 2 and some containers with only an upper port as illustrated in FIG. 3. In these examples, the plurality of connection hoses of the build material management station 100 may be connected to the container ports as required and the processing circuitry may control air flow parameters for air flows through respective conduits to vary the air flow characteristics depending upon the container type and the connection configuration as required.

As with the example described by reference to FIG. 1, the pump in the pumping module 120 may provide a positive pressure differential downstream of the pump to force air to flow from the pump to and through the build material container 331, for example via the cooling upper portion connection hose 314. In this case, if non-coalesced build material is to be collected during the cooling operation, then a separate port for outlet of the non-coalesced build material may be provided, as well as a conduit to draw off collected non-coalesced build material into a conduit network of the build material management station 110 for storage.

Figure 4:
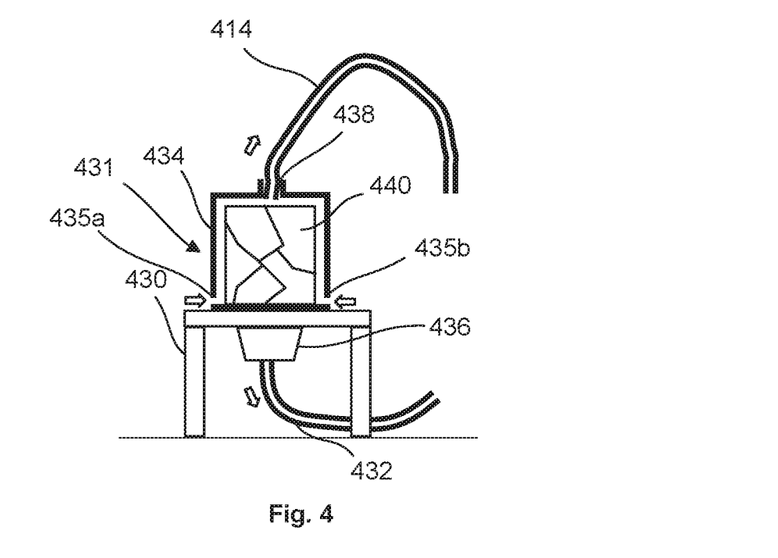
FIG. 4 is a diagram of a further example of a cooling module for use in a build material management system.

FIG. 4 is a diagram of a further example of a cooling module for use in a build material management system. The cooling module shown in FIG. 4 can be considered to be an amalgamation of the features of the cooling modules shown in FIGS. 2 and 3, because it has both an upper portion connection hose and a lower portion connection hose of the build material management station 110 physically connected to respective ports of the build material container. The cooling module comprises a build material container 431 supported above a ground surface on a build material container stand 430. The build material container 431 has a housing 434 substantially enclosing a volume of build material 440. Directly after a 3D printing operation and for a time thereafter, the volume of build material 440 can be warm. In this example, the housing 434 is substantially cuboidal and encloses the volume of build material 440 on each of six sides.

The housing 434 has defined therein an upper port 438 provided in an upper portion of the build material container housing 434, in this example substantially centrally in a top face of the housing 434. In alternative examples the upper port 438 of the build material container 431 may be provided anywhere in an upper part of the build material container housing 434, such as in an upper half of a side wall. A larger magnitude vertical spacing between the upper port 438 and a lower port 436 of the build material container 431 may promote improved air circulation. A larger vertical spacing between upper and lower hose connections may also promote gravity assisted removal of unfused build material as it is disturbed by a pumped air flow through the build material container 431.

The upper port 438 in this example is to allow air to flow out of the build material container 431. The upper port 438 may be provided with fixings (not shown) to connect to a cooling upper portion connection hose 414. The cooling upper portion connection hose 414 is connected to the build material management station 110 as described in relation to FIG. 1 previously. In the FIG. 4 arrangement, a cooling air flow can be provided cooperatively via flow of air directed via the first and second conduits 414, 432 through the upper port 438 and the lower port 436 of the housing 434. The housing 434 also has air holes 435a, 435b in a lower portion of its side walls. The air holes 435a, 435b in this are to allow air to flow into the build material container 431. But air may flow out of the air holes 435a, 435b in other examples. Thus, the build material container 431 is a non-airtight container.

The build material container 431 is further provided with the lower port 436 in a lower portion thereof, to allow a further air flow out of the housing 434 and through the volume of build material 440. An air flow enters the housing 434 through the air holes 435a, 435b under an action of the pumping module 120. The lower port 436 is connected to a cooling lower portion connection hose 432, in turn connected to the build material management station 110 described previously with reference to FIG. 1. The lower port 436 is provided on a base of the container 431 in this example, but in alternative examples, the lower port may be provided in a lower portion of one of the side walls of the container 431.

An air flow may be directed by the pump interface of the build material management station 110, through at least one of the upper portion connection hose 414 and lower portion connection hose 432 via the build material container 431, using the upper and lower portion connection hoses 414, 432 to cooperatively cool a build volume of fused and unfused build material located in the build material container 431. Provision of the lower port 436 for connection of the lower port connection hose 432 conveniently allows the air flow to be directed through the build material container 431 to perform both cooling of the manufactured object (fused build material) and extraction of at least some of the unfused build material from the build material container 431 into a conduit network of the build material management station for storage and potentially re-use, depending upon inherent recyclability of the given build material.

In a similar way to the cooling module described in relation to FIG. 2 and FIG. 3, a pressure differential may be applied via the cooling upper portion connection hose 414 with a pressure lower than atmospheric pressure applied to a build material management system end of the cooling upper portion connection hose 414. In this way, air at atmospheric pressure may be drawn into the build material container 431 through the air holes (vents) 435a, 435b to create the air flow. The air flow passes through and/or around the volume of build material 440 and into the cooling upper portion connection hose 414 via the upper port 438. Alternatively or additionally at a given time, a pressure differential may be applied via the cooling lower portion connection hose 432 with a pressure lower than atmospheric pressure applied to a build material management system end of the cooling lower portion connection hose 432. Air at atmospheric pressure may be drawn into the build material container 431 through the air holes 435a, 435b to create a cooling air flow. The air flow passes through and/or around the volume of build material 440 and into the cooling lower portion connection hose 432 via the lower port 436.

The air flow(s) cause air surrounding the volume of build material 440 which is heated by the warm volume of build material 440 to be removed and replaced by cooler air. In this way, a speed of the cooling of the volume of build material 440 can be increased. As with the examples above, the air flow may be caused as a result of a positive pressure differential downstream of the pump in the pumping module 120.

In some examples, the volume of build material 440 at least partially breaks apart as a result of the air flow therethrough, resulting in yet further improved cooling. In some examples, the build material management system (not shown in FIG. 2) connected to the lower port 236 via the cooling lower portion connection hose 232 may control the pumping module (not shown in FIG. 2) to draw air in intermittent intervals through each of the cooling upper portion connection hose 414 and the cooling lower portion connection hose 432. In some examples, the intermittent intervals may be at least partially non-overlapping, such that in some time intervals or periods, the pumping module is controlled to cause air to flow through the cooling upper portion connection hose 414 but not the cooling lower portion connection hose 432 and in other time intervals or periods, the pumping module is controlled to cause air to flow through the cooling lower portion connection hose 432 but not the cooling upper portion connection hose 414.

In some examples, the pumping module may be controlled to cause air to flow through both the cooling upper portion connection hose 414 and the cooling lower portion connection hose 432 simultaneously. In some further examples, the build material management station 110 may control the pumping module to cause air to flow intermittently through the build material container 431. In other examples, the build material management station 110 may control the pumping module to cause air to flow continuously through the build material container 431, either at a constant or varying air flow rate. The air flow may be controlled by operation of one or more valves (not shown) in the pumping module of the build material management system. In some examples, the pumping module 120 may be usable to blow (rather than suck) air through one of the cooling upper portion connection hose 414 and the cooling lower portion connection hose 432, and to draw the blown air through another of the cooling upper portion connection hose 414 and the cooling lower portion connection hose 432.

Figure 5:
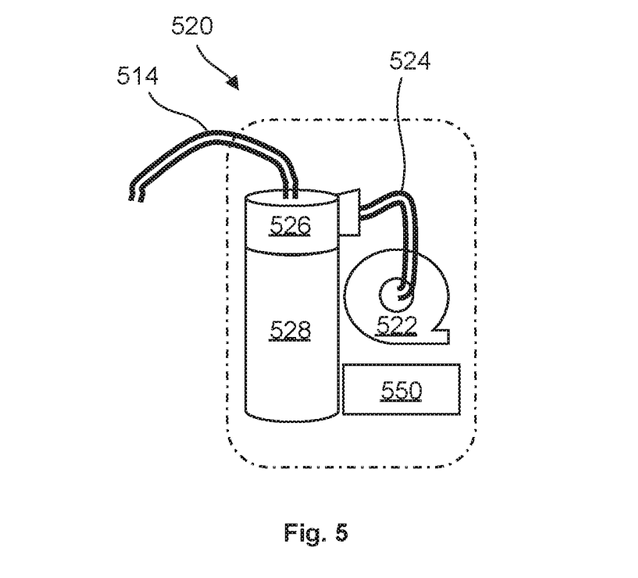
FIG. 5 is a diagram of an example of a pumping module of a build material management system for a 3D printing system.

FIG. 5 is a diagram of an example of a pumping module for a 3D printing system. The pumping module 520 comprises a pump 522 to be connected to a transportable build material container in the form of a build material container (not shown in FIG. 5) via one or more cooling connection hoses in the form of a cooling upper portion connection hose 514 and a pump-to-build material trap conduit 524. During operation, the pump 522 creates a pressure differential between the pump 522 and a distal end of the cooling upper portion connection hose 514 to draw air into the cooling upper portion connection hose 514 from the build material container. In this example, the pump 522 is a centrifugal pump and causes a pressure below atmospheric pressure upstream of the pump 522 in the cooling upper portion connection hose 514. A build material trap 526, such as a cyclonic separator or a filter, is provided between the cooling upper portion connection hose 514 and the pump-to-build material trap conduit 524. The build material trap 526 prevents build material present within the cooling upper portion connection hose 514 and moving towards the pump 522 from entering into the pump-to-build material trap conduit 524. The build material extracted by the build material trap 526 is stored within a storage container 528.

In an example, the pumping module 520 is to provide cooling to the build material container connected to the cooling upper portion connection hose 514 without providing an unpacking function, and so an amount of build material transported within the cooling upper portion connection hose 514 towards the pump 522 may be small or non-existent. In this example, the storage container 528 may be small. When the pumping module 120 is to provide cooling but not an unpacking function, the air flow drawn into the cooling upper portion connection hose 514 may be sufficiently low as not to transport loose build material from the transportable container into the cooling upper portion connection hose 514. In some examples, the build material trap 526 may be located within the build material container, and so there may be no build material trap 526 in the pumping module 520 between the upper portion connection hose 514 and the pump 522.

In an alternative example, the pumping module 520 may also be to extract at least a portion of non-coalesced build material from the build material container to the storage container 528. In this alternative example, the storage container 528 may be sized to be large enough to receive the portion of non-coalesced build material. The pumping module 520 further comprises a controller 550 having processing circuitry (not shown) to control the operation of the pumping module 520, and thus to control the operation of the pump 522 in creating an air flow through the build material container. Although the pumping module 520 shown in FIG. 5 includes a cooling upper portion connection hose 514, but other examples of pumping modules 520 may include a cooling lower portion connection hose either instead of or in addition to the cooling upper portion connection hose 514. The pumping module 520 also includes one or more valves in some examples to control the air flow through the one or more cooling connection hoses.

The upper portion connection hose 514 of the FIG. 5 example comprises a continuous length of hose extending from inside the pumping module 520 to outside the pumping module and this single length of hose may extend all the way to a port on the upper portion of the build material container. In other examples, the upper portion connection hose 514 may have a first length that is internal to the pumping module 520 and to the build material management station 110 and a second length extending from a user-accessible port on the outside of the build material management station to the upper portion of the build material container. The second length of hose may, for example screw or lock into the user-accessible port to allow maintenance or replacement of this part of the hose. The first (internal) length of the upper portion connection hose 514 may on its own form the first connection conduit for connecting to the upper portion of the build material container although the second (external) length may be used to complete the connection.

Similarly, a lower portion connection hose (such as the hose 432 in FIG. 4) may have a first length of hose internal to the pumping module 520 or build material management station 110 and a second length of hose extending from a user-accessible external port on the build material management station 110 to connect with a lower portion of the build material container. In this case, the first length of the lower portion connection hose that is internal to the build material management station may be the second connection conduit for connecting to the lower portion of the build material container, albeit via the second (external) hose length.

As described previously in relation to FIG. 4, in some examples, during operation, the pumping module 520 may blow air from the pump 522 through the cooling upper portion connection hose 514 (or a further hose). In some examples having a plurality of conduits in the form of a plurality of connection hoses, the pumping module 520 may be provided with a plurality of pumps to blow air out of one or more connection hoses whilst simultaneously drawing air into other connection hoses using different pumps. In some examples, the build material management system may comprise a plurality of pumping modules.

Figure 6:
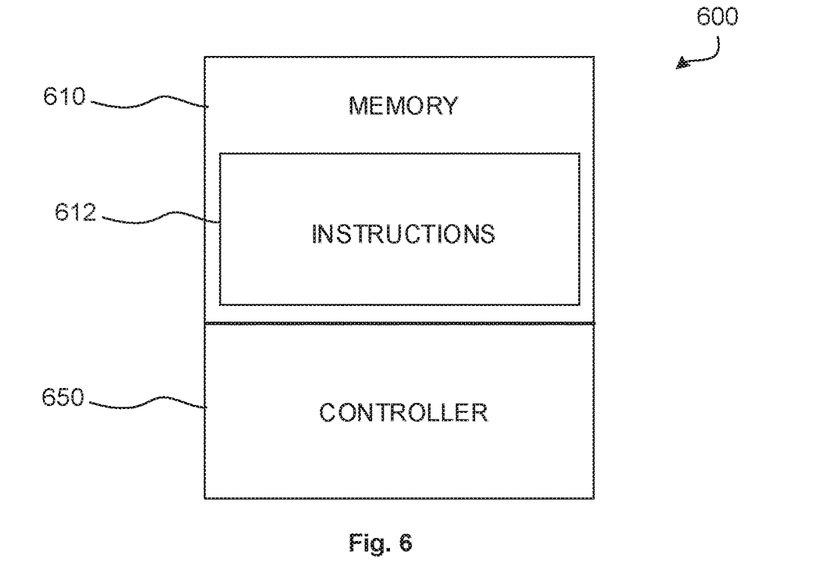
FIG. 6 is a simplified illustration of a build material management system according to an example.

FIG. 6 is a simplified illustration of a build material management system 600 according to an example of the present disclosure. The system 600 comprises a controller 650 that controls the general operation of the build material management system 600. In the example shown in FIG. 6 the controller 650 is a microprocessor-based controller that is coupled to a memory 610, for example via a communications bus (not shown). The memory stores machine-executable instructions 612. The controller 650 may execute the instructions 612 and hence control operation of the build material management system 600 in accordance with those instructions. The machine-readable instructions may be provided on a transient or a non-transient machine-readable storage medium.

In one example, the controller 650 controls the pumping module 520 to implement the cooling operation described hereinbefore.

Figure 7:
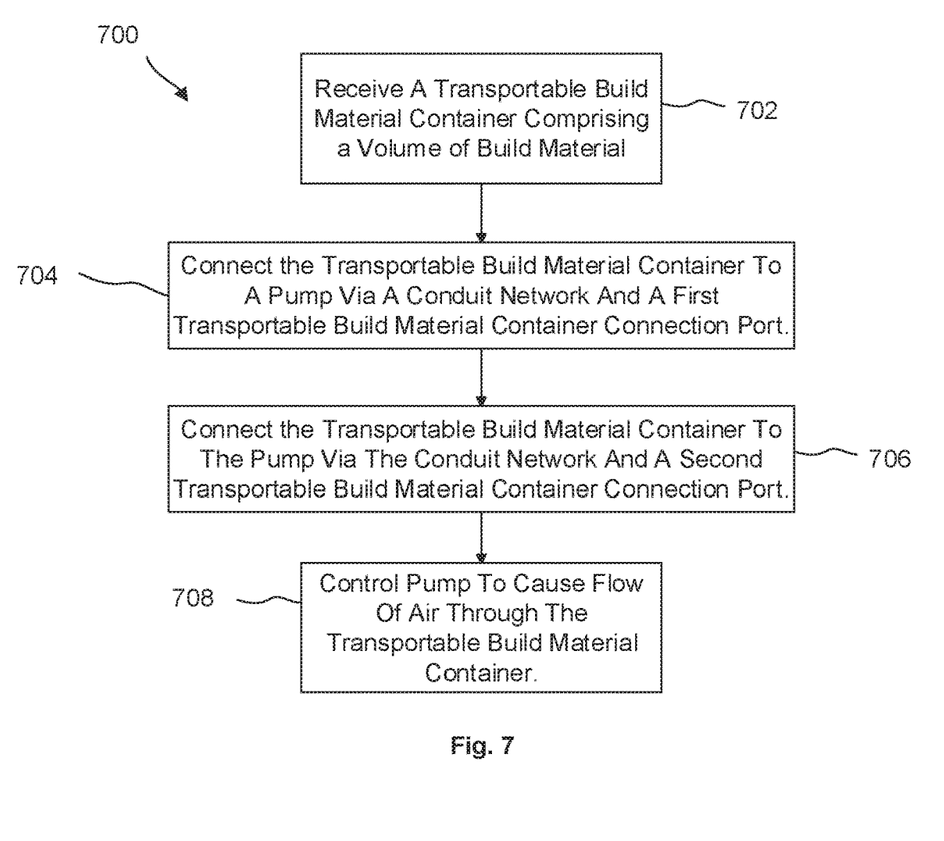
FIG. 7 is a flow diagram outlining a method of operating a build material management system according to an example.

FIG. 7 is a flow diagram outlining a method of operating a build material management system according to an example of the present disclosure. In the method 700 of FIG. 7, at 702, a (transportable) build material container is received by the build material management system. The build material container comprises a volume of hot build material. At 704, the build material container is connected to a pump interface of the build material management system via a first conduit and a first build material container connection port. At 706, the build material container is also connected to the pump via a second conduit originating from the build material management station 100 and a second build material container connection port. The first and second conduits may be connected to an upper portion and a lower portion respectively of the build material container or may be connected at different points in the same portion of the container such as at two different locations in a top end. At 708, the pump is controlled by processing circuitry in the build material management station 110 to cause a flow of air through the build material container depending upon configuration of a valve arrangement in the conduit system connecting the pump interface to the plurality of connection hoses. The valve arrangement may comprise one or more valves and the valves may be set to be open or closed by the processing circuitry depending upon at least one of a connection status of the connection hoses to ports on build material containers and at least one air flow parameter specifying appropriate air flow characteristics for a cooling operation. The processing circuitry may control the cooperative cooling of a build volume in the build material container by configuring at least one air flow parameter to set, for example an instantaneous or a consistent air flow rate and an air flow direction through the container. Air flows in the two different conduits connected to the same container may be configured by the processing circuitry to select, for example, air flow parameters comprising one or more of: an air flow rate; a variation of air flow rate with time; an air flow direction by blowing or sucking air at positive or negative pressure; an intermittent or continuous air flow profile. The processor may independently set the air flow characteristics in the first and second conduits to cooperatively achieve a desired air flow profile through the build material container such as a desired air flow direction and to control changes in air flow through the container as a function of time. The processing circuitry may select one or more air flow control parameters depending on contents of the containers or characteristics of the containers such as container volume or location(s) of the container ports.

Build material containers may comprise handles, wheels or other structural features to facilitate easy transportation of the build material container. In some circumstances, it may be desirable to transfer the contents of a transportable container that has been used in a 3D printing operation to another transportable container, for example to decouple the build process from the cooling and unpacking processes.

Examples described herein can be realised in the form of hardware, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. Storage devices and storage media are examples of machine-readable storage that are suitable for storing a program or programs that, when executed, implement examples described herein. Accordingly, examples provide a program comprising code for implementing a system or method as described herein and a machine readable storage storing such a program.

Throughout the description and claims of this specification, the words "comprise" and "contain" and variations of them mean "including but not limited to", and they are not intended to (and do not) exclude other components, integers or process elements Throughout the description and claims of this specification, the singular encompasses the plural unless the context otherwise suggests. Where the indefinite article is used, the specification is to be understood as contemplating plurality as well as singularity, unless the context suggests otherwise.

Features, integers or characteristics described in conjunction with a given example of the disclosure are to be understood to be applicable to any other example described herein unless incompatible therewith. All of the features disclosed in this specification (including any accompanying claims, abstract and drawings), and/or all of the stages of any method or process so disclosed, may be combined in any combination, except combinations where at least some of such features and/or stages are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the stages of any method or process so disclosed.

The phrase "At least one of A, B and C" means (A), (B), (C), (A and B), (A and C), (B and C) or (A, B and C).

According to one example, there is provided a method of cooling a volume of printed build material in a build material management apparatus, the volume of printed build material comprising one or more 3D printed parts and a portion of non-coalesced build material, surrounding the one or more 3D printed parts, the method comprising:

receiving at least one build material container comprising the volume of printed build material at the build material management apparatus;

connecting at least two of a plurality of ports on the at least one build material container to a build material management apparatus comprising a plurality of conduits to perform; and     controlling air flows in at least two of the plurality of conduits connected to respective ports of the at least one build material container by independently setting a given air flow parameter in the at least two of the plurality of conduits to cool the volume of printed build material.

The invention claimed is:

1. A build material management apparatus for a three dimensional, 3D, printing system, the build material management apparatus comprising:
a plurality of conduits connectable to ports on respective different build material containers to perform simultaneous cooling of build material in the different build material containers; and
processing circuitry to control coupling of a pump interface to the plurality of conduits to independently set a given air flow parameter for cooling build material in the different build material containers.

2. Build material management apparatus as claimed in claim 1, wherein a first conduit and a second conduit of the plurality of conduits are connectable to different ports on a single one of the different build material containers.

3. Build material management apparatus as claimed in claim 2, wherein the processing circuitry is to control the pump interface to set an air flow parameter in at least one of the plurality of conduits to cause an intermittent flow of air through a connected build material container port.

4. Build material management apparatus as claimed in claim 1, comprising a valve assembly to selectively restrict or enable air flow between the pump interface and of the plurality of conduits under control of the processing circuitry.

5. Machine executable instructions stored on a machine-readable medium, the instructions being executable by a controller of a build material management apparatus having a plurality of conduits connectable to ports on respective different build material containers to perform simultaneous cooling of build material in the different build material containers, the machine executable instructions comprising:
instructions to control coupling of a pump interface to the plurality of conduits to independently set a given air flow parameter for cooling build material in the different build material containers.

6. Machine executable instructions as claimed in claim 5, comprising instructions for controlling the air pressure interface to cause an intermittent flow of air through at least one of the plurality of conduits.

7. Machine executable instructions as claimed in claim 5, wherein the air flow parameter comprises at least one of: a timing characteristic of the air flow, a rate of the air flow and a direction the air flow.

8. A container for containing a volume of coalesced and non-coalesced build material from an additive manufacturing system, the container comprising:
a body;
a connection port in the body;
an opening in the body to allow passage of air into the container, the opening located opposite the connection port so that air flowing from the opening to the connection port passes through non-coalesced build material when the container contains a volume of coalesced and non-coalesced build material; and
wherein the connection port is connectable to an air pressure source to cause air flow from the opening to the connection port the volume of coalesced and non-coalesced build material when the container contains the volume of coalesced and non-coalesced build material.

9. A container as claimed in claim 8, wherein the opening is an air hole.

10. A container as claimed in claim 8, wherein the opening is an open end of the container.

* * * * *